Jan. 14, 1969   JAMES E. WEBB   3,422,354
ADMINISTRATOR OF THE NATIONAL AERONAUTICS
AND SPACE ADMINISTRATION
TEST FIXTURE FOR PELLET-LIKE ELECTRICAL ELEMENTS
Filed Oct. 26, 1966

TO CURRENT OR
VOLTAGE SOURCE

INVENTOR.
ANTHONY J. NASUTI
BY
ATTORNEYS

United States Patent Office 3,422,354
Patented Jan. 14, 1969

3,422,354
TEST FIXTURE FOR PELLET-LIKE ELECTRICAL ELEMENTS
James E. Webb, Administrator of the National Aeronautics and Space Administration, with respect to an invention by Anthony J. Nasuti, Hyde Park, Mass.
Filed Oct. 26, 1966, Ser. No. 590,146
U.S. Cl. 324—158                     1 Claim
Int. Cl. G01r 11/02

---

ABSTRACT OF THE DISCLOSURE

An apparatus for simultaneously supporting a plurality of elements to be subjected to an electrical test. The apparatus includes a block having a channel therein and pairs of spring biased contact pins disposed perpendicular to the channel for receiving the elements to be tested. Insulators are positioned in the channel between each pair of contact pins, and a means is provided for applying compressive force to the contact pins, insulators and elements under test to insure adequate electrical contact.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to electrical testing equipment and more particularly to an apparatus for simultaneously supporting a plurality of small elements subjected to electrical testing.

Most presently used small semiconductive devices, such as diodes, comprise pellets of semiconductive material. These pellets are subjected to extensive electrical tests during manufacturing to insure the proper operational characteristics of the finished devices. Since the pellets are quite small and the number of devices manufactured is very large, it is desirable to be able to test groups of pellets simultaneously with a minimum of handling of the small pellets.

Accordingly, it is an object of the invention to provide an apparatus for supporting a plurality of pellets to be subjected to electrical tests.

Another object is to provide an inexpensive apparatus on which a relatively large number of pellets to be subjected to electrical tests may be easily supported with a minimum of handling.

A further object is to provide a simple apparatus for simultaneously supporting a plurality of pellets with each element being provided with means for supplying electrical energy thereto in order to test its electrical characteristics.

These and other objects are achieved by providing a block of insulating material with a slot or channel on one of its sides. The channel is made deep enough so that each pellet may be securely placed therein. A plurality of electrically conductive pins extend through the block of material in one or more rows parallel to the slot. A wiper contact is welded to each pin with a portion of the contact extending over the slot in a direction perpendicular thereto. The contacts are spaced so that when a pellet is placed in the channel between adjacent contacts, it is in contact therewith. Each pair of wiper contacts are preferably spring biased towards one another to insure proper electrical contact with a pellet placed therebetween. Electrical energy is supplied to each pellet by means of wires soldered to the opposite ends of the two pins to which are welded the contacts in contact with the pellet.

The novel features that are considered characteristics of this invention are set forth with particularity in the appended claim. The invention will best be understood from the following description when read in connection with the accompanying drawings, in which:

Figure 1:
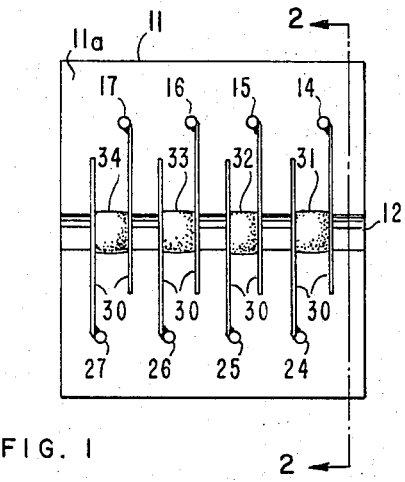
FIGURE 1 is a top view of one embodiment of the invention.
Figure 2:
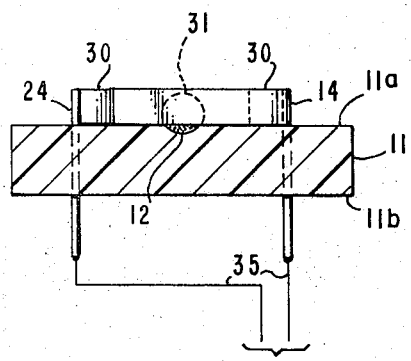
FIGURE 2 is a cross-sectional view along lines 2—2.

Attention is now directed to FIGURES 1 and 2 which are a top view and a sectional view along lines 2—2 respectively, of one embodiment of the invention which includes a block of insulating material 11, having a slot or channel 12 extending on its surface 11a. The block supports a first plurality of pins designated 14–17 arranged in a first row parallel to the channel 12, while a second plurality of pins 24–27 are disposed on the other side of channel 12 in another row parallel thereto. To each pin is welded a wiper contact 30 which extends in a direction perpendicular to the channel, with at least a portion of each contact extending over the channel. Each pin in one of the rows, such as pin 14, is associated with an opposite pin in the other row to form a pair of pins. The contacts, welded to each pair of pins, are preferably spring biased towards one another, so that when a pellet, such as pellet 31, is placed in the channel 12 therebetween, the two contacts are firmly in contact with opposite sides of the pellet.

In FIGURE 1, reference numerals 32, 33, and 34 represent other pellets, firmly supported between contacts welded to three other pairs of pins comprising pins 15 and 25, 16 and 26, and 17 and 27. Electrical testing current or voltage is provided to each pellet by means of leads 35 soldered to the back ends of each pair of pins, such as pins 14 and 24, which extend or protrude through a surface 11b of block 11.

From the foregoing, it should thus be appreciated that the simple multipin apparatus, herebefore described, provides simple means for supporting a plurality of pellets so that they may be simultaneously tested. Each pellet is placed between a pair of exposed contacts associated with a pair of pins to which electrical energy is supplied. After the tests, the pellets are simply extracted from between the contacts which are in friction contact therewith. It should further be appreciated that the plurality of pins embedded in block 11 and extending from two parallel sides thereof may be connected to a multipin male connector, presently known in the electronic art. Such connectors are commercially available from a large number of manufacturers, such as Cannon Electric, a division of International Telephone and Telegraph (ITT) Corporation. Thus, the apparatus may be terminated into such a connector by welding or soldering the pins of the pellet test fixture to the pins of the connector. Such connectors are available with as many as 50 pins. Thus by utilizing such a connector, an apparatus for supporting 25 pellets simultaneously may be inexpensively produced.

Figure 3:
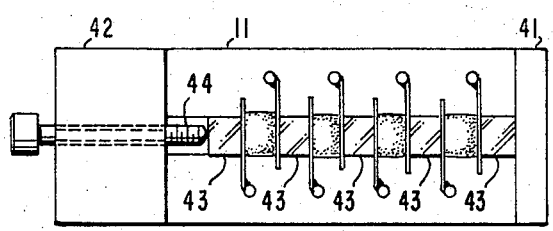
FIGURE 3 is a top view of another embodiment of the invention.

In another embodiment of the invention, a top view of which is shown in FIGURE 3, an end plate 41 is fastened to the block 11 at one end of channel 12 while a block 42 is mounted on block 11 at the other end of the channel. Also a plurality of small insulators 43 are placed in the channel so as to insulate each pair of contacts associated with another pair of pins from adjacent contacts of different pairs. Block 42 supports a biasing member such as the threaded screw 44, the function of which is to bias all the insulators 43, contacts 30 and the various pellets towards end plate 41 and thereby insure that each pair of contacts are in proper electrical contact with the pellet to which they are to provide electrical testing current. The biasing screw 44 may be replaced by a biasing spring or any other simple biasing arrangement.

Figure 4:
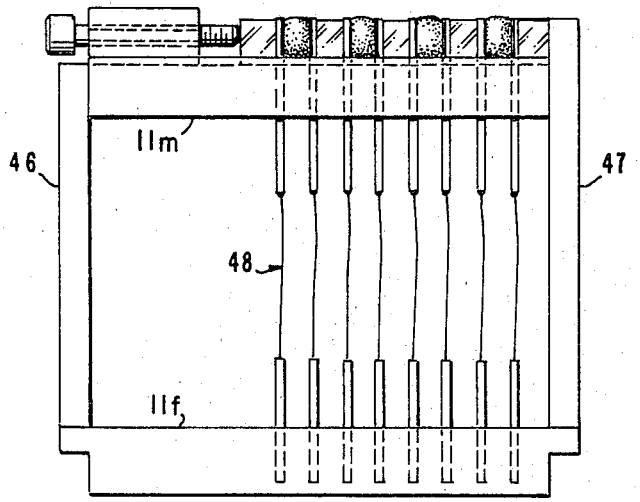
FIGURE 4 is a front view of an embodiment actually reduced to practice.

In one actual reduction to practice, the apparatus was inexpensively constructed by utilizing a male 50 pin Cannon connector, and attaching the pellet test fixture apparatus to it. The connector is designated by numerals 11m and 11f in FIGURE 4, to which reference is made herein.

Respective pins in the pellet test fixture and the Cannon connector were interconnected by electrically conductive wires 48, soldered to the back ends of the pins. Thus the front ends of the pins of connector 11m were used to weld the wiper contacts thereto, while the apertured ends of the pins in the male Cannon connector 11f were used as the input terminals to which electrical current is supplied by means of pins of a properly wired complementary female connector.

The use of commercially avaidable connectors which are easily modifiable and the pellet test fixture, in accordance with the teachings disclosed herein, have been found to greatly reduce the cost of constructing the apparatus, by means of which a plurality of pellets may be supported for simultaneous testing purposes. The use of a channel to locate each pellet and a pair of spring biased wiper contacts to provide current thereto greatly simplify the task of properly locating the pellet for testing, thus further reducing the time and cost of testing a large number of pellets.

There has accordingly been shown and described herein a novel, simple and inexpensive apparatus for supporting a plurality of pellets to be subjected to electrical testing. It is appreciated that those familiar with the art may make modifications in the arrangements as shown without departing from the true spirit of the invention. Therefore, all modifications and/or equivalents are deemed to fall within the scope of the invention as claimed in the appended claim.

What is claimed is:

1. An apparatus for supporting a plurality of elements subjected to electrical testing comprising:
    a block of electrically insulating matter having first and second parallel surfaces;
    a plurality of electrically conductive pins parallelly supported by said block in first and second parallel rows, each pin having first and second ends extending through said first and second surfaces respectively, each pin in said first row being associated with a pin in said second row which is opposite thereto to define a pin pair;
    a plurality of spring biased wiper contacts each electrically connected to the first end of each pin, the contacts being substantially perpendicularly disposed to said first and second rows and extending between said rows, the contacts for each pin pair, being in spaced, overlapping relationship;
    a slot extending between said rows in a direction parallel thereto, said slot defining a channel for a plurality of elements subject to electrical testing to be located therein, each element being located in said channel between the contacts connected to a pair of pins;
    means for electrically connecting the second ends of each pair of pins to a source of electrical energy to test the elements located in said channel with the elements in electrical contact with the wiper contacts connected to the pair of pins;
    a plurality of electrically insulating members disposed in said channel between adjacent contacts associated with connectors of different connector pairs to electrically insulate contacts of different connector pairs from one another and frictionally engage the contacts of each connector pair with the element located therebetween; and
    an end plate disposed at one end of said slot and biasing means located at the other end of said slot to bias the plurality of insulating members, the plurality of elements being tested and the contacts on either side of each element toward said end plate to insure electrical contact between each pair of contacts and the element therebetween.

References Cited
UNITED STATES PATENTS

| | | | |
|---|---|---|---|
| 1,718,529 | 6/1929 | Coldwell | 339—176 XR |
| 3,175,153 | 3/1965 | Paessler | 324—158 |
| 3,188,598 | 6/1965 | Pferd. | |
| 3,195,096 | 7/1965 | Campo | 339—193 XR |

RUDOLPH V. ROLINEC, *Primary Examiner.*

E. L. STOLARUN, *Assistant Examiner.*

U.S. Cl. X.R.

339—92